July 5, 1932. J. W. CAVANAUGH 1,865,675
WINDSHIELD HEATER
Filed June 1, 1931
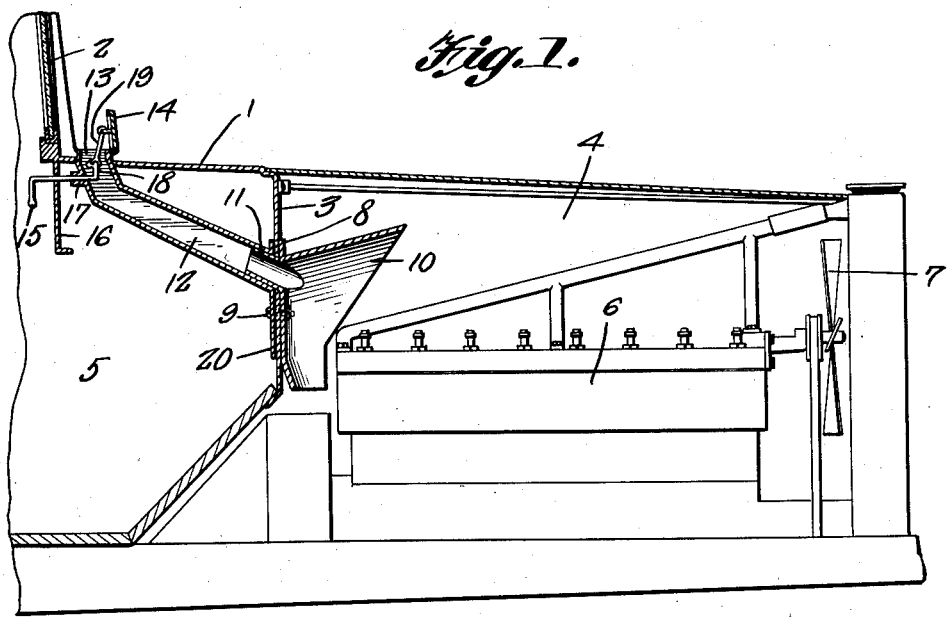
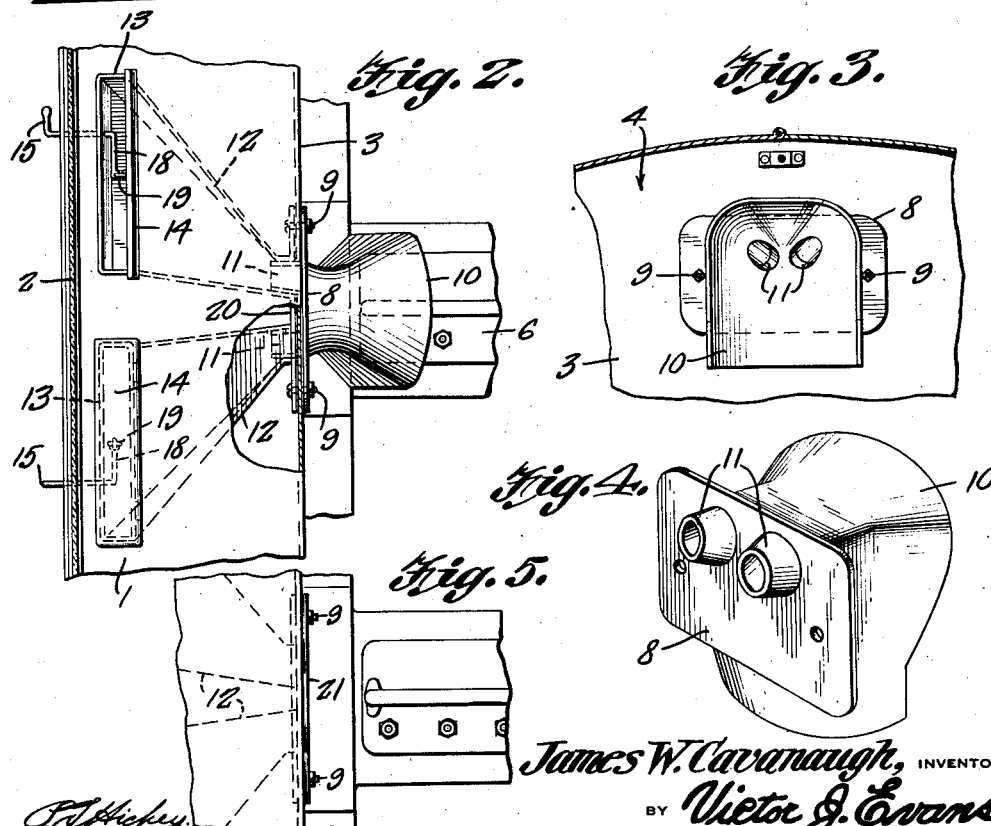
James W. Cavanaugh, INVENTOR
BY Victor J. Evans and Co. ATTORNEYS Patented July 5, 1932

1,865,675

UNITED STATES PATENT OFFICE

JAMES W. CAVANAUGH, OF MESHOPPEN, PENNSYLVANIA

WINDSHIELD HEATER

Application filed June 1, 1931. Serial No. 541,464.

This invention relates to windshield heaters for motor vehicles and has for the primary object, the provision of a device of the above stated character which will efficiently collect heated air from the engine of the motor vehicle and deliver said air against the outer face of the windshield to melt ice or snow which may adhere thereto, thus maintaining the windshield free of snow or ice to permit the operator of the vehicle to have clear vision.

Another object of this invention is the provision of a windshield heater including a heat collecting device and heat conveying means so associated with each other and the vehicle that the full width of the windshield may receive heated air or the heat collecting element may be removed and the heat conveying means closed against the reception of heated air consequently rendering the device inoperative which is desirable in summer's driving.

A further object of this invention is the provision of a windshield heater of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a windshield heater constructed in accordance with my invention and applied to a motor vehicle.

Figure 2 is a vertical horizontal sectional view illustrating the same.

Figure 3 is a front elevation partly in section illustrating the heat collecting element.

Figure 4 is a perspective view illustrating the heat collecting element.

Figure 5 is a fragmentary plan view illustrating the heat collecting element removed from the vehicle and the heat conveying means closed against the reception of heat from the motor compartment of the vehicle.

Referring in detail to the drawing, the numeral 1 indicates the cowl of a motor vehicle body, having associated therewith the windshield 2 and partition 3 closing the engine compartment 4 from the driving compartment 5. The engine is illustrated at 6 and during the operation thereof, the fan 7 employed for cooling the radiator, drives air rearwardly from the engine and said air becomes heated to a high temperature and in order to collect this air and deliver the same against the windshield 2, my invention is employed.

The partition 3 is provided with an opening in rear of the engine 6 and an attaching plate 8 is detachably secured to the partition 3 over said opening by fasteners 9 and has formed integral therewith a substantially funnel shaped collecting element 10, the upper portion of which projects over the engine with the rear wall of the collecting element extending downwardly between the engine and the partition 3. Nipples 11 are formed integral with the attaching plate 8 and are in communication with the interior of the funnel shaped collecting element and project into the compartment 5 by way of the opening in the partition 3 and extend into conduits 12.

The top wall of the cowl 1 in advance of the windshield 2 is provided with elongated slots to receive the discharge ends 13 of the conduits 12. The conduits 12 flare from their intake ends toward their discharge ends 13 and have hinged to their discharge ends covers 14 which are normally urged into closed position by springs 14' and are operated by handles 15 journalled to the instrument board 16 of the vehicle. The inner ends of the handles 15 are journalled in the conduits 12 as shown at 17 and are provided with right angularly extending portions 18 pivotally connected to the covers by links 19 so that on rotating the handles in one direction, the covers will be swung upwardly into an open position for the purpose of permitting the heated air collected by the element 10 to pass through the conduits and to be discharged against the outer face of the windshield and adjacent the lower edge thereof so that said heated air will contact with substantially the entire surface of the windshield for the purpose of melting snow and ice that may adhere thereto. The rotation of the handles 15 in an opposite direction will bring the covers into a position for closing the conduits preventing the heated air from the engine from striking the windshield.

The forward ends of the conduits are formed integral with an attaching plate 20 secured to the partition 3 over the opening thereof by the fasteners 9 for the purpose of preventing the conduits from becoming accidentally disconnected from the nipples 11.

During summer driving when the necessity of such a device is not needed, the collecting element 10 may be removed and the plate 21 placed over the opening in the partition 3 by being secured to the latter by the fasteners 9 to prevent the heated air within the engine compartment from entering said conduits.

While I have shown and described the preferred embodiment of my invention, it will be understood that minor changes in construction, combination and arrangement of parts may be made without departing from the spirit and scope of my invention, as claimed.

Having thus described my invention, what I claim is:

In combination with a motor vehicle having a partition between the engine compartment and the driver's compartment and provided with an opening, an attaching plate overlying said opening, fasteners detachably securing the plates to the partition, a collecting element carried by said plate and arranged in rear of the engine, nipples carried by the plate and in communication with the collecting element and extending through the opening, a second attaching plate receiving the nipples and removably secured to the partition by said fasteners and overlying the opening, flaring conduits formed on said second attaching plate and receiving the nipples extending through the cowl of the vehicle in advance of the windshield, and a control means for said conduits.

In testimony whereof I affix my signature.

JAMES W. CAVANAUGH.